Patented May 15, 1923.

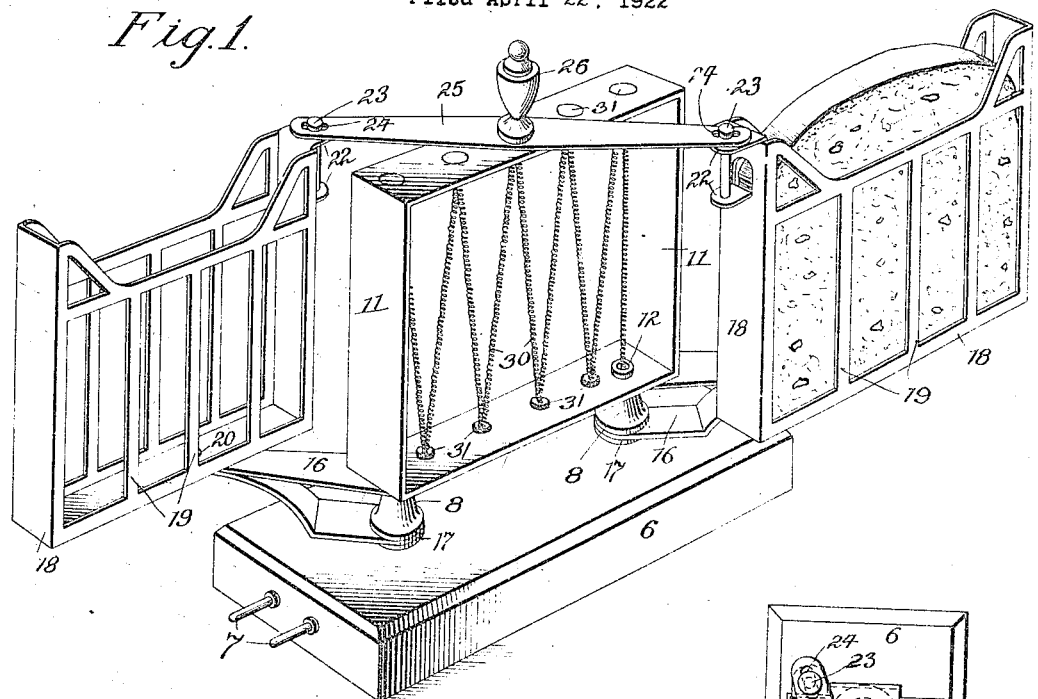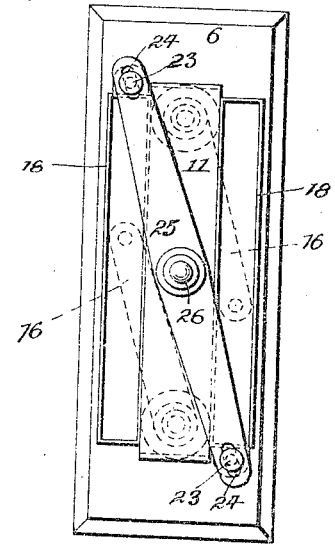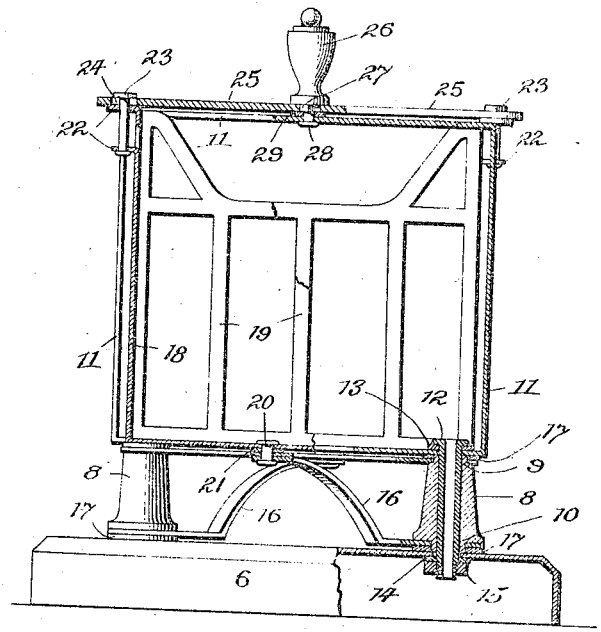

1,455,190

UNITED STATES PATENT OFFICE.

WILLIAM W. DODGE, JR., OF MERIDEN, CONNECTICUT.

TOASTER.

Application filed April 22, 1922. Serial No. 555,986.

*To all whom it may concern:*

Be it known that I, WILLIAM W. DODGE, Jr., a citizen of the United States, residing at Meriden, in the county of New Haven and State of Connecticut, have invented certain new and useful Improvements in Toasters, of which the following is a specification.

This invention relates to electric toasters, and particularly to an improved bread carrier mechanism.

In its preferred form, the invention includes two bread carriers which are interchanged simultaneously by translatory movement from side to side of the heating element, this action being secured by supporting the bread carriers as a part of a parallel motion linkage. Obviously a single bread carrier might be shifted in the same way from side to side of a heating element having two opposite effective surfaces. It will be observed that, although the bread does not rotate in its movement from side to side of the heating element, the effect is to present alternately the opposite sides of the slice of bread to the heating element.

A practical embodiment of the invention is illustrated in the accompanying drawing, in which:—

Fig. 1 is a perspective view of the complete toaster with the bread carriers in an intermediate position. In this view, the heating element is only generally illustrated as its particular form is not material to the invention.

Fig. 2 is a plan view with the bread carriers presented to the heating element.

Fig. 3 is a side view broken away on two different planes to show the hinge constructions. In this view, the heating element is omitted.

The base of the toaster is indicated at 6 and the usual electric connector terminals at 7. Mounted on the base 6 are two supports 8 which are shouldered, as clearly shown in Fig. 3, to provide an upper journal 9 and a lower journal 10. The frame 11, which carries the heating element, rests on the upper ends of the supports 8 and these in turn are seated on the base 6. Tubular bolts 12 pass through each support 8 and serve to tie the heating element frame 11 to the base 6. With these bolts, washers 13 and 14 and nuts 15 are used in the relation clearly shown in Fig. 3. Any equivalent connection might be substituted.

A bifurcated bracket 16 swings on the journals 9 and 10, being spaced from the base 6 and frame 11 by washers 17 and 21. Two bread racks 18, each consisting of a rectangular frame with bars or grids 19 at its opposite sides, are pivoted near their mid-lengths on the ends of the respective brackets 16 by means of the rivets 20. Each bread rack is formed with a pair of spaced ears 22 which support a connecting pin 23. The pin 23 of each bread rack works in a corresponding longitudinal slot 24 formed in the actuator arm 25. This actuator arm is pivoted at its mid-length at the middle of the top of the frame 11. It may be swung about this pivot by means of a knob 26 which is rigidly attached thereto. This attachment may conveniently consist of a stud fixed in the knob 26 and having a squared portion 27 which engages the actuator arm 25. A washer 29 is interposed between the arm 25 and the frame 11, and the stud is riveted over to form a head 28 beneath the frame 11. Other equivalent constructions may obviously be substituted.

While I prefer to use longitudinal slots 24 in the actuator arms 25 in order to permit a little lost motion as the parts swing past that position in which the two bread racks are alined with each other, and hence to reduce any tendency to bind at this point, I am aware that the device will operate successfully with close fitting round holes, and consequently no lost motion at these points. The slot is useful, however, because it allows the actuating lever 25 to be turned slightly to swing the bread racks 18 out of line while the brackets 16 remain at rest. This slight movement is sufficient to overcome any tendency to lock on dead center.

The heating element, which is generally illustrated at 30, is supported in the frame element by any suitable insulators 31. As heretofore suggested, the form of the heating element is not material except that it should have two effective faces. No attempt, therefore, is made to illustrate the heating element in detail.

The action of the device is obvious from an inspection of Fig. 1, and it has the advantage of offering in attractive form a very simple mechanism for actuating the two bread racks simultaneously. It will be observed that the motion of each bread rack is translatory movement in a circular path. By using the term "translatory movement" in the claims, however, I do not mean to imply mathematical accuracy, for, where elongated slots 24 are used in the actuator arm, there is the possibility of slight rotary movement of the bread racks near their alined position. It will be observed, however, that, in the two limiting or toasting positions of the racks, they maintain strict parallelism with each other, and that their deviation from parallelism, under any circumstances, is very slight.

What I claim is:—

1. The combination of a heating element having opposite effective faces; a bread carrier; and supporting and guiding means serving to present said carrier to the opposite faces of said heating element by translatory movement.

2. The combination of a heating element having opposite effective faces; a bread carrier; and a parallel motion linkage for supporting said carrier and operable to present the opposite sides of said carrier to the opposite faces of said heating element by translatory movement.

3. The combination of a heating element having opposite effective faces; a pair of bread carriers; and a parallel motion linkage for supporting said carriers, and operable to present the carriers interchangeably to opposite sides of said heating element by simultaneous translatory movements.

4. The combination of a heating element having opposite effective faces; a pair of bread carriers; and a parallel motion linkage, said linkage including two swinging supports mounted on spaced bearings approximately in the plane of the heating element and hinged to respective bread carriers near the mid-lengths of the latter, and an actuating link pivoted at its mid-length on a bearing approximately in the plane of the heating element and pivoted at its ends to respective bread carriers near the ends thereof.

In testimony whereof I have signed my name to this specification.

WILLIAM W. DODGE, Jr.